(12) United States Patent
Bisson (10) Patent No.: US 11,779,502 B2
(45) Date of Patent: Oct. 10, 2023

(54) POWDERED COMPOSITION, A POURABLE, WATER-CONTAINING, UNCURED BIODEGRADABLE COMPOSITION, A CURED BIODEGRADABLE ARTICLE, PREPARATION METHODS, AND USES THEREOF

(71) Applicants: LES ESPACES MEMORIA INC., Outremont (CA); 8078041 Canada Inc. (Studio Diane Leclair Bisson), Montreal (CA)

(72) Inventor: Diane Bisson, Montreal (CA)

(73) Assignees: LES ESPACES MEMORIA INC., Montreal (CA); 8078041 CANADA INC. (STUDIO DIANE LECLAIR BISSON), Montreal (CA)

( * ) Notice: Subject to any disclaimer, the term of this patent is extended or adjusted under 35 U.S.C. 154(b) by 474 days.

(21) Appl. No.: 16/739,228

(22) Filed: Jan. 10, 2020

(65) Prior Publication Data

US 2021/0212877 A1 Jul. 15, 2021

(51) Int. Cl.
*A61G 17/007* (2006.01)
*A61G 17/08* (2006.01)
(Continued)

(52) U.S. Cl.
CPC .......... *A61G 17/007* (2013.01); *A61G 17/08* (2013.01); *C08K 3/30* (2013.01); *C08K 3/34* (2013.01);
(Continued)

(58) Field of Classification Search
CPC .. A61G 17/007; A61G 17/08; A61G 2203/90; C08K 3/30; C08K 3/34;
(Continued)

(56) References Cited

U.S. PATENT DOCUMENTS

| 5,612,385 A | 3/1997 | Ceaser et al. |
| 5,636,418 A * | 6/1997 | Vail, III ................. A61G 17/08 27/1 |

(Continued)

FOREIGN PATENT DOCUMENTS

| JP | 2003220100 A | 8/2003 |
| WO | 2007063361 A1 | 6/2007 |

*Primary Examiner* — William L Miller
(74) *Attorney, Agent, or Firm* — Ziolkowski Patent Solutions Group, SC (57) ABSTRACT

A powdered composition useful for the preparation of a biodegradable material, said composition comprising 40 to 95 wt. % of a gypsum containing material that is environmentally acceptable; 0 to 60 wt. % of particles of at least one environmentally acceptable filler; and 3 to 10 wt. % of an environmentally acceptable binding agent. A pourable, water-containing, uncured and biodegradable composition comprising a mixture of a component A and a component B. The component A comprises: 40 to 95 wt. % of a gypsum containing material that is environmentally acceptable; 0 to 60 wt. % of particles of at least one environmentally acceptable filler; and 3 to 10 wt. % of an environmentally acceptable binding agent. The component B comprises water. The weight ratio component A: component B varies from 100:40 to 100:100. Biodegradable articles, methods and uses for preparing the pourable, water-containing, uncured and biodegradable articles (e.g. funeral urn).

21 Claims, 3 Drawing Sheets

(51) Int. Cl.
  *C08K 3/30* (2006.01)
  *C08K 3/34* (2006.01)
(52) U.S. Cl.
  CPC ............... *C08K 2003/3045* (2013.01); *C08K 2201/005* (2013.01); *C08K 2201/018* (2013.01)
(58) Field of Classification Search
  CPC ...... C08K 2003/3045; C08K 2201/005; C08K 2201/018; E04H 13/008
  USPC .............................................................. 27/1
  See application file for complete search history.

(56) References Cited

U.S. PATENT DOCUMENTS

| | | | | |
|---|---|---|---|---|
| 5,701,642 | A * | 12/1997 | Order ..................... | E04H 13/00 27/2 |
| 5,774,958 | A * | 7/1998 | Casimir ............... | A61G 17/007 27/1 |
| 6,041,483 | A * | 3/2000 | Burch .................... | A61G 17/08 27/1 |
| 6,533,854 | B2 | 3/2003 | Kesselring et al. | |
| 6,878,199 | B2 | 4/2005 | Bowden et al. | |
| 7,636,991 | B1 * | 12/2009 | Scalisi, III ............. | E04H 13/00 27/35 |
| 7,665,195 | B1 * | 2/2010 | Vazquez-Perez ...... | A61G 17/08 27/1 |
| 9,027,303 | B2 | 5/2015 | Lichtinger et al. | |
| 10,123,926 | B2 * | 11/2018 | Brewer .............. | A61G 17/0073 |
| 2003/0046798 | A1 * | 3/2003 | Valles Camps ........ | A61G 17/08 27/1 |
| 2005/0120915 | A1 | 6/2005 | Bowden et al. | |
| 2008/0264882 | A1 * | 10/2008 | Sviberg-Krahner ... | A61G 17/08 211/85.27 |
| 2009/0013513 | A1 * | 1/2009 | Laurens ................. | A61G 17/08 27/1 |
| 2009/0077779 | A1 | 3/2009 | Zimmerman et al. | |
| 2009/0078162 | A1 | 3/2009 | Clausi et al. | |
| 2009/0241309 | A1 * | 10/2009 | Smith ................ | A61G 17/0136 27/2 |
| 2011/0089605 | A1 * | 4/2011 | Olcina ................. | A61G 17/007 264/241 |
| 2015/0048554 | A1 * | 2/2015 | Karrer ..................... | B28B 7/342 264/494 |
| 2016/0250091 | A1 * | 9/2016 | Bisson ................. | E04H 13/008 27/1 |
| 2016/0271660 | A1 * | 9/2016 | Camps ..................... | B44C 5/00 |

* cited by examiner

POWDERED COMPOSITION, A POURABLE, WATER-CONTAINING, UNCURED BIODEGRADABLE COMPOSITION, A CURED BIODEGRADABLE ARTICLE, PREPARATION METHODS, AND USES THEREOF

FIELD OF THE INVENTION

The present invention relates to a powdered composition, an uncured and water containing pourable composition, a cured biodegradable article, preparation methods, and uses thereof.

Also, the present invention provides an improved method and materials for forming degradable objects (e.g. funeral urns) for ground burials that degrade rapidly, produced through the use non-toxic and stable recycled materials such as crushed stones and gypsum, and of starch as a bounding agent.

Also, the invention also relates to a process for producing an object (e.g. a container such as an urn) made of biodegradable material, a shaped body which is obtainable by the process of mixing the materials and pouring in a mould of desired size and shape.

More particularly, the present invention relates to:
- a powdered composition useful for the preparation of at least one part of a biodegradable article, such as a biodegradable urn, or an intermediate uncured and water containing pourable composition useful for the preparation of at least one part of a cured biodegradable article;
- an uncured and water containing pourable composition obtained from the admixture of the powdered composition with water, and useful for the preparation of at least one part of a cured biodegradable article;
- a method for the preparation of the uncured and water containing pourable composition;
- a method for the preparation of a cured biodegradable article;
- a cured, biodegradable article; and/or
- a use of at least one of the powdered composition, at least one pourable, water-containing, uncured and biodegradable composition and/or cured, biodegradable article to provide at least one part of a biodegradable object (e.g. a biodegradable urn).

BRIEF DESCRIPTION OF THE PRIOR ART

There is a very strong need for biodegradable objects (e.g. biodegradable urns) which are environmentally acceptable. Indeed, it is important to avoid releasing contaminants in the soil while said objects decompose in said soil (e.g. under the effect of water) in order to prevent contamination of said soil and/or the phreatic tablecloth.

Up to now, only few attempts were made to overcome this problem. As an example, in recent years, there have been profound changes in funeral practices in all industrialized countries. Cremation, which consists of burning bodies and grinding ashes, has been particularly widespread and now accounts high percentage of funerary practices. Cremation is part of a broader reflection on the environmental impact of traditional practices. Burial areas are becoming scarce and the underground degradation of coffins and bodies is considered potential sources of soil contamination, including by formaldehyde, mercury and other non-degradable materials. As a result, a growing number of people are opting for burial urn and are increasingly interested in biodegradable urns, although they still represent a small percentage of the products available on the market.

The biodegradable urns, although environmentally friendly by nature, still introduce in the soil materials that can contaminate the soil, such as synthetic glues and varnishes that are high pollutants. Also, many of the urns claiming to be biodegradable do not entirely or rapidly disintegrate. Material such a wood, natural clays or thick paper, may take years to start degrading in the soil, impacting on land sustainability. Finally, the industry has not yet explored the possibility of maximizing recycled content in order to further reduce environmental impacts.

As an example of a biodegradable urn, published Japanese patent application no. 2003220100 describes a naturally decomposable urn made of (i) gypsum and/or clay (e.g. 45 wt. % gypsum), (ii) starch (e.g. 40 wt. % starch), (iii) optionally one or more biodegradable material (e.g. vegetable fibers) and/or inorganic material (e.g. crushed shell, volcanic ash, etc.), and (iv) a sufficient amount of a glue-water. To obtain the biodegradable material, the glue water is admixed with ingredients (i) to (iii), until obtaining a mix that can be poured in a mould and allowed to dry and cure. Such an urn when buried in the soil will decompose within from 7 to 10 years.

However, this decomposable urn shows the drawback of requiring large amounts of starches, the preparation and use of a glue water which may be damageable to the environment, and providing urns having a substantially long degradation time.

There is a strong need for biodegradable materials which are environmentally acceptable, decompose quickly in the soil and prevent releasing contaminants in the soil and/or the phreatic tablecloth.

Also, there is a strong need for a method for preparing biodegradable materials which requires a minimum number of steps and/or energy.

Also, there is a strong need for a method for preparing an uncured and water containing biodegradable composition which is ready to be poured and cured into a mould.

Also, there is a strong need for a powdered composition allowing to prepare a pourable, water-containing, uncured and biodegradable composition ready to be poured into a mould and cured therein to provide a cured biodegradable article.

Also, there is a strong need for a use of a powdered composition allowing to prepare a cured biodegradable article.

Also, there is a strong need for a use of a pourable, water-containing, uncured and biodegradable composition allowing to prepare a cured biodegradable article.

SUMMARY OF THE INVENTION

It has been surprisingly discovered that according to the following embodiments of the invention, at least some, preferably all, the above-mentioned drawbacks are overcome, and/or some, preferably all, the above-mentioned needs are fulfill.

One embodiment of the invention relates to a sustainable method of making a rapidly degradable object (e.g. a memorial object or urn) by mixing non-toxic recycled stable materials with a non-toxic bounding agent. The resultant material has good strength properties with respect to its use and shows a good degradability in normal soil.

Another embodiment of the invention relates to a method of shaping a pourable mixture of uncured and water-containing biodegradable composition, by placing the same in a mold of desired size and shape and optionally heating said composition to cure it and form a desired object (e.g. a memorial object or urn).

Another embodiment of the invention relates to the obtention of cured object in which the aggregates are disperse uniformly, that does not shrink, distort, or crack.

Another embodiment of the invention relates to a powdered composition, preferably useful for the preparation of a biodegradable material, preferably a cured biodegradable material and/or a pourable, water-containing, uncured and biodegradable composition, said powdered composition comprising:
40 to 95 wt. % of a gypsum containing material that is environmentally acceptable;
0 to 60 wt. % of particles of at least one environmentally acceptable filler; and
3 to 10 wt. % of an environmentally acceptable binding agent.

Another embodiment of the invention relates to the powdered composition defined hereinabove, said powdered composition comprising:
60 wt. % of the gypsum containing material that is environmentally acceptable;
36 wt. % of the particles of the at least one environmentally acceptable filler; and
4 wt. % of the environmentally acceptable binding agent.

An embodiment of the invention relates to a powdered composition useful for the preparation of a biodegradable material, said composition preferably consisting of:
40 to 95 wt. % of a gypsum containing material that is environmentally acceptable;
0 to 60 wt. % of particles of at least one environmentally acceptable filler; and
3 to 10 wt. % of an environmentally acceptable binding agent.

Another embodiment of the invention relates to the powdered composition defined hereinabove, said powdered composition preferably consisting of:
60 wt. % of the gypsum containing material that is environmentally acceptable;
36 wt. % of the particles of the at least one environmentally acceptable filler; and
4 wt. % of the environmentally acceptable binding agent.

Another embodiment of the invention relates to the powdered composition defined hereinabove, wherein the gypsum containing material is a recycled gypsum. Preferably, the recycled gypsum is a recycled (dihydrate) gypsum obtained from the disposal of drywall waste, generated predominantly from construction and demolition sites. More preferably, the gypsum drywall, also referred to as wallboard, gyproc, or sheetrock, is a recycled dihydrate gypsum under the form of particles having a particle size varying from 20 μm to 0.2 mm. Chemical analysis of said recycled dihydrate gypsum are known to be non-toxic and compatible with the environment. Said recycled dihydrate gypsum is also known to be useful as an agricultural additive of soil or compost.

Another embodiment of the invention relates to the powdered composition defined hereinabove, wherein the recycled gypsum comprises 93 wt. % of calcium sulphate dihydrate ($CaSO_4 \cdot 2H_2O$) and 7 wt. % of paper.

Another embodiment of the invention relates to the powdered composition defined hereinabove, wherein the recycled gypsum preferably consists of 93 wt. % of calcium sulphate dihydrate ($CaSO_4 \cdot 2H_2O$) and 7 wt. % of paper.

Much more preferably, the paper may be separated, and only the calcium sulphate is recycled. Calcium sulfate is known to be used as a fertilizer in agriculture as it contributes to the activation of bacteria in soil.

Gypsum is an inorganic substance that is not biodegraded by micro-organisms (to $CO_2$ and $H_2O$). However, it will be slowly solubilized as sulphate ions ($SO_4^{2-}$) and calcium ions ($Ca^{2+}$). The solubility of gypsum is estimated at about 2 g/L. These ions are already present in large quantities in the environment and are essential nutrients for plant growth.

Another embodiment of the invention relates to the powdered composition defined hereinabove, wherein the recycled gypsum is at least partially dehydrated into a hemihydrate gypsum and/or a calcined gypsum. Preferably, the hemihydrate gypsum or calcined gypsum is obtained after subjecting the dihydrate gypsum to a heat treatment. Also, the recycled gypsum may consist of a mix of dihydrate gypsum, hemihydrate gypsum or calcined gypsum. More particularly, a mix of recycled hemihydrate gypsum and recycled dihydrate gypsum is particularly advantageous to very quickly decompose in soil, especially a mix of 75 wt. % of recycled hemihydrate gypsum and 25 wt. % recycled dihydrate gypsum.

Another embodiment of the invention relates to the powdered composition defined hereinabove, wherein the particles of the at least one environmentally acceptable filler can be made of any stable material, preferably obtained from recycled materials. Said at least one environmentally acceptable filler can be selected from the group consisting of stone particles, mineral particles, glass particles and ceramic microspheres residues, and/or selected from the group consisting of environmentally acceptable plant base residues such as coffee grounds. Preferably, the at least one environmentally acceptable filler may be selected from the group consisting of stone particles, glass particles and ceramic microspheres residues obtained from industrial waste. Such at least one environmentally acceptable filler may further help the fragmentation of the cured biodegradable material in the soil.

Another embodiment of the invention relates to the powdered composition defined hereinabove, wherein the stone particles are quartz particles.

Another embodiment of the invention relates to the powdered composition defined hereinabove, wherein the particles of the at least one environmentally acceptable filler, have a diameter ranging from 0.1 to 10 mm, preferably from 1 to 4 mm.

Another embodiment of the invention relates to the powdered composition defined hereinabove, wherein the environmentally acceptable binding agent is a starch.

Another embodiment of the invention relates to the powdered composition defined hereinabove, wherein the environmentally acceptable binding agent is powdered form, and substantially free of toxic and contaminants. Preferably, said environmentally acceptable binding agent may have a particle size varying from 7 to 17 μm that will pass at 99% through a #20 mesh sieve. More preferably the environmentally acceptable binding agent is wheat starch or corn starch.

Another embodiment of the invention relates to the powdered composition defined hereinabove, further comprising at least one environmentally acceptable additive selected from the group consisting of natural colorants (e.g. colorants from natural sources). An example of natural colorant may consist of a powder obtained from dehydrated flower pistil.

Another embodiment of the invention relates to the powdered composition defined hereinabove, wherein the amount of water to be admixed with said powdered composition is such that the resulting mixture has a weight ratio powdered composition/water varying from 100:40 to 100:100, preferably from 100:50 to 100:90.

Another embodiment of the invention relates to the powdered composition defined hereinabove, wherein the weight ratio powdered composition: water is about 100:50.

Another embodiment of the invention relates to a pourable, water-containing, uncured and biodegradable composition comprising a mixture of a component A and a component B, wherein the component A comprises:
40 to 95 wt. % of a gypsum containing material that is environmentally acceptable;
0 to 60 wt. % of particles of at least one environmentally acceptable filler; and
3 to 10 wt. % of an environmentally acceptable binding agent; and
wherein the component B comprises water; and
wherein the weight ratio of the component A to the component B varies from 100:40 to 100:100, preferably from 100:50 to 100:90.

Another embodiment of the invention relates to the pourable, water-containing, uncured and biodegradable composition defined hereinabove, wherein the component A comprises:
60 wt. % of a gypsum containing material that is environmentally acceptable;
36 wt. % of the particles of at least one environmentally acceptable filler; and
4 wt. % of the environmentally acceptable binding agent.

Another embodiment of the invention relates to a pourable, water-containing, uncured and biodegradable composition comprising a mixture of a component A and a component B, wherein the component A preferably consists of:
40 to 95 wt. % of a gypsum containing material that is environmentally acceptable;
0 to 60 wt. % of particles of at least one environmentally acceptable filler; and
3 to 10 wt. % of an environmentally acceptable binding agent; and
wherein the component B preferably consists of water; and
wherein the weight ratio of the component A to the component B varies from 100:40 to 100:100, preferably from 100:50 to 100:90.

Another embodiment of the invention relates to the pourable, water-containing, uncured and biodegradable composition defined hereinabove, wherein the component A preferably consists of:
60 wt. % of a gypsum containing material that is environmentally acceptable;
36 wt. % of the particles of at least one environmentally acceptable filler; and
4 wt. % of the environmentally acceptable binding agent.

Another embodiment of the invention relates to the pourable, water-containing, uncured and biodegradable composition defined hereinabove, wherein the gypsum containing material is a recycled gypsum. Preferably, the recycled gypsum is a recycled (dihydrate) gypsum from the disposal of drywall waste, generated predominantly from construction and demolition sites. More preferably, the gypsum drywall, also referred to as wallboard, gyproc, or sheetrock, is a recycled dihydrate gypsum under the form of particles having a particle size varying from 20 μm to 0.2 mm. Chemical analysis of said recycled dihydrate gypsum are known to be non-toxic and compatible with the environment. Indeed, said recycled dihydrate gypsum is known to be useful as an agricultural additive of soil or compost.

Another embodiment of the invention relates to the pourable, water-containing, uncured and biodegradable composition defined hereinabove, wherein the recycled gypsum comprises 93 wt. % of calcium sulphate dihydrate ($CaSO_4 \cdot 2H_2O$) and 7 wt. % of paper.

Another embodiment of the invention relates to the pourable, water-containing, uncured and biodegradable composition defined hereinabove, wherein the recycled gypsum preferably consists of 93 wt. % of calcium sulphate dihydrate ($CaSO_4 \cdot 2H_2O$) and 7 wt. % of paper.

Much more preferably, the paper may be separated, and only the calcium sulphate is recycled, predominantly to be used as a fertilizer in agriculture as it contributes to the activation of bacteria in soil.

Gypsum is an inorganic substance that is not biodegraded by micro-organisms (to $CO_2$ and $H_2O$). However, it will be slowly solubilized as sulphate ions ($SO_4^{2-}$) and calcium ions ($Ca^{2+}$). The solubility of gypsum is estimated at about 2 g/L. These ions are already present in large quantities in the environment and are essential nutrients for plant growth.

Another embodiment of the invention relates to the pourable, water-containing and uncured and biodegradable composition defined hereinabove, wherein the recycled gypsum is at least partially dehydrated into a hemihydrate gypsum and/or a calcined gypsum. Preferably, the hemihydrate gypsum or calcined gypsum is obtained after subjecting the dihydrate gypsum to a heat treatment. Also, the recycled gypsum may consist of a mix of dihydrate gypsum, hemihydrate gypsum or calcined gypsum. More particularly, a mix of recycled hemihydrate gypsum and recycled dihydrate gypsum is particularly advantageous to very quickly decompose in soil, especially a mix of 75 wt. % of recycled hemihydrate gypsum and 25 wt. % recycled dihydrate gypsum.

Another embodiment of the invention relates to the pourable, water-containing, uncured and biodegradable composition defined hereinabove, wherein the particles of the at least one environmentally acceptable filler can be made of any stable material, preferably obtained from recycled material. Said at least one environmentally acceptable filler can be selected from the group consisting of stone particles, mineral particles, glass particles and ceramic microspheres residues, and/or selected from the group consisting of environmentally acceptable plant base residues, such as coffee grounds. Preferably, the at least one environmentally acceptable filler may be selected from the group consisting of stone particles, glass particles and ceramic microspheres residues obtained from industrial waste. Such at least one environmentally acceptable filler may further help the fragmentation of the cured biodegradable material in the soil.

Another embodiment of the invention relates to the pourable, water-containing, uncured and biodegradable composition defined hereinabove, wherein the stone particles are quartz particles.

Another embodiment of the invention relates to the pourable, water-containing, uncured and biodegradable composition defined hereinabove, wherein the particles of the at least one environmentally acceptable filler, have a particle diameter ranging from 0.1 to 10 mm, preferably from 1 to 4 mm.

Another embodiment of the invention relates to the pourable, water-containing, uncured and biodegradable composition defined hereinabove, wherein the environmentally acceptable binding agent is a starch.

Another embodiment of the invention relates to the pourable, water-containing, uncured and biodegradable composition defined hereinabove, wherein the environmentally acceptable binding agent is substantially free of toxic and contaminants. Preferably, said environmentally acceptable binding agent may have a particle size varying from 7 to 17 µm that it will pass at 99% through a #20 mesh sieve. More preferably, the environmentally acceptable binding agent is wheat starch or corn starch, more preferably food grade wheat starch or corn starch.

Another embodiment of the invention relates to the pourable, water-containing, uncured and biodegradable composition defined hereinabove, further comprising environmentally at least one environmentally acceptable additive selected from the group consisting of natural colorants (e.g. colorants from natural sources). An example of natural colorant may consist of a powder obtained from dehydrated flower pistil.

Another embodiment of the invention relates to the pourable, water-containing, uncured and biodegradable composition defined hereinabove, wherein the weight ratio powdered composition:water is about 100:50.

Another embodiment of the invention relates to a method for the preparation of a pourable, water-containing, uncured and biodegradable composition, said method comprising the step of mixing the powdered composition defined hereinabove and water, wherein the weight ratio powdered composition:water varies from 100:40 to 100:100, preferably from 100:50 to 100:90.

Another embodiment of the invention relates to the method defined hereinabove for the preparation of a pourable, water-containing, uncured and biodegradable composition, wherein the weight ratio powdered composition:water is about 100:50.

Another embodiment of the invention relates to the method defined hereinabove for the preparation of a pourable, water-containing, uncured and biodegradable composition, wherein the step of mixing is carried out with any appropriate mixing means.

Another embodiment of the invention relates to a method for the preparation of a cured and biodegradable article, said method comprising the step of:
  pouring the pourable, water-containing, uncured and biodegradable composition defined hereinabove, into a mould;
  curing the pourable mixture contained in the mould;
  recovering from the mould, the cured and moulded biodegradable article.

Another embodiment of the invention relates to the method defined hereinabove for the preparation of the cured and biodegradable article, wherein pourable, water-containing, uncured and biodegradable composition is obtained according to the method defined hereinabove for the preparation of the pourable, water-containing, uncured and biodegradable composition.

Another embodiment of the invention relates to the method defined hereinabove for the preparation of a cured and biodegradable article, wherein the curing is carried out by subjecting the pourable, water-containing, uncured and biodegradable composition contained into the mould, to a heat treatment in order to cure the same and provide the cured and biodegradable article.

Another embodiment of the invention relates to the method defined hereinabove for the preparation of a cured and biodegradable article, wherein the heat treatment is carried out at a temperature varying from 80° C. to 140° C., preferably from 90° C. to 135° C.

Another embodiment of the invention relates to the method defined hereinabove for the preparation of a cured and biodegradable article, wherein the heat treatment is carried out at a temperature of about 93° C.

Another embodiment of the invention relates to the method defined hereinabove for the preparation of a cured and biodegradable article, wherein the heat treatment is carried out in an oven for a period varying from 1 to 6 hours, preferably from 3 to 6 hours.

Another embodiment of the invention relates to the method defined hereinabove for the preparation of a cured and biodegradable article, wherein when the recycled gypsum is at least partially dehydrated into a hemihydrate gypsum and/or a calcined gypsum, the heat required to obtain the cured, biodegradable article results, at least in part, preferably in totality, from the reaction of water with the at least partially dehydrated into a hemihydrate gypsum or a calcined gypsum. Also, the recycled gypsum may consist of a mix of dihydrate gypsum, hemihydrate gypsum or calcined gypsum. More particularly, a mix of recycled hemihydrate gypsum and recycled dihydrate gypsum is particularly advantageous to quickly decompose in soil, especially a mix of 75 wt. % of recycled hemihydrate gypsum and 25 wt. % recycled dihydrate gypsum.

Another embodiment of the invention relates to the method defined hereinabove for the preparation of the cured and biodegradable article, wherein the mould is such that it will allow to provide a one-piece biodegradable article (e.g. a one-piece biodegradable funeral urn).

Another embodiment of the invention relates to the method defined hereinabove for the preparation of the cured and biodegradable article, wherein the mould is such that it will allow to provide a cured biodegradable article representing a part of a cured biodegradable object. Several cured biodegradable articles may be assembled together to form a biodegradable object (e.g. a biodegradable funeral urn).

Another embodiment of the invention relates to a cured biodegradable article that may represent any possible kind of containers or articles having any possible shapes and volumes. Preferably, said cured biodegradable article is a biodegradable funeral urn.

Another embodiment of the invention relates to a cured biodegradable article obtained from the method defined hereinabove for the preparation of the cured and biodegradable article.

Another embodiment of the invention relates to a cured biodegradable article comprising at least two distinct parts, at least one of said at least two distinct parts comprising a moulded biodegradable article obtained from the method defined hereinabove for the preparation of a cured and biodegradable article, and the at least two distinct parts being joined together by an environmentally acceptable adhesive.

Another embodiment of the invention relates to the cured biodegradable article defined hereinabove, wherein said article shows a resistance to impact which is comparable to the one of floor tiles.

Another embodiment of the invention relates to the cured biodegradable article defined hereinabove, wherein the environmentally acceptable adhesive is a non-toxic organic glue.

Another embodiment of the invention relates to the cured, biodegradable article defined hereinabove, wherein the non-toxic organic glue is from vegetal or animal origin, preferably a fish glue.

Another embodiment of the invention relates to the cured biodegradable article defined hereinabove, which disaggregates in the soil within one week to three months.

Another embodiment of the invention relates to the cured biodegradable article (e.g. a cured biodegradable urn or any other articles) as defined above, wherein after having been buried in the soil:

if the component A comprises dihydrate gypsum, completely disintegrated after three months, if the component A comprises a hemihydrate gypsum, is almost completely disintegrated after three months (i.e. the biodegradable article is friable under a small pressure of a finger);

if the component A comprises a gypsum which is a mix of 75% hemihydrate gypsum and 25% dihydrate gypsum, is almost completely disintegrated after one month (i.e. the biodegradable article is friable under a small pressure of a finger).

Another embodiment of the invention relates to the biodegradable article defined hereinabove, wherein said biodegradable article is a funeral urn or a part thereof.

Another embodiment of the invention relates to a use of the powdered composition defined hereinabove, for the preparation of a funeral urn or a part of a funeral urn.

Another embodiment of the invention relates to the use of the powdered composition defined hereinabove, wherein the funeral urn or the part of the funeral urn disaggregates in the soil between one week to three months.

Another embodiment of the invention relates to a use of the pourable, uncured, water-containing and biodegradable composition defined hereinabove, for the preparation of a funeral urn or a part of a funeral urn.

Another embodiment of the invention relates to the use of the pourable, uncured, water-containing and biodegradable composition defined hereinabove, wherein the funeral urn or the part of the funeral urn disaggregates in the soil between one week to three months.

The present invention will be better understood with reference to the following drawings.

EXAMPLES

The present invention will be better understood with reference to the following example:

Example 1

Preparation of a Powdered Composition

Dry ingredients were mixed together. More particularly, 60 grams of cooked gypsum, 36 grams of quartz and 4 grams of wheat starch were mixed together to form a powdered composition (component A).

The cooked gypsum was obtained by subjecting powdered recycled gypsum to a heat treatment of 150° C. for 2 hours and then cooling at 60° C. The gypsum so obtained is a hemihydrated gypsum.

The quartz particles were obtained by passing them through a sieve and recovering quartz particles having a particle size of 1-4 mm.

The wheat starch was obtained by passing it through a sieve to obtain a particle size varying from 7-17 µm.

Example 2

Preparation of a Pourable, Water-Containing, Uncured and Biodegradable Composition 50 grams of water (component B) were mixed with the powdered composition obtained from example 1 (i.e. component A), to form a pourable, water-containing, uncured and biodegradable composition. The components A and B were mixed together until obtaining a pourable paste (defining the pourable, water-containing, uncured and biodegradable composition).

Example 3

Filing of a Mould with the Pourable, Water-Containing, Uncured and Biodegradable Composition The pourable, water-containing, uncured and biodegradable composition obtained from example 2, was poured into a mould. The mold was a single part mould allowing to provide a one-piece article.

Thereafter, the mould, was placed in an oven. The temperature of said oven was fixed to 93° C., to cure the pourable, water-containing, uncured and biodegradable composition and provide a cured biodegradable article after a period of time of 4 hours.

After, the curing, the cured, biodegradable article was removed from the mould. The cured, biodegradable article was a one-piece funeral urn. The resulting cured, biodegradable urn after having buried in the soil showed a complete degradation after 1 month.

Example 4

Preparation of Various Parts of a Funeral Urn

Figure 1:
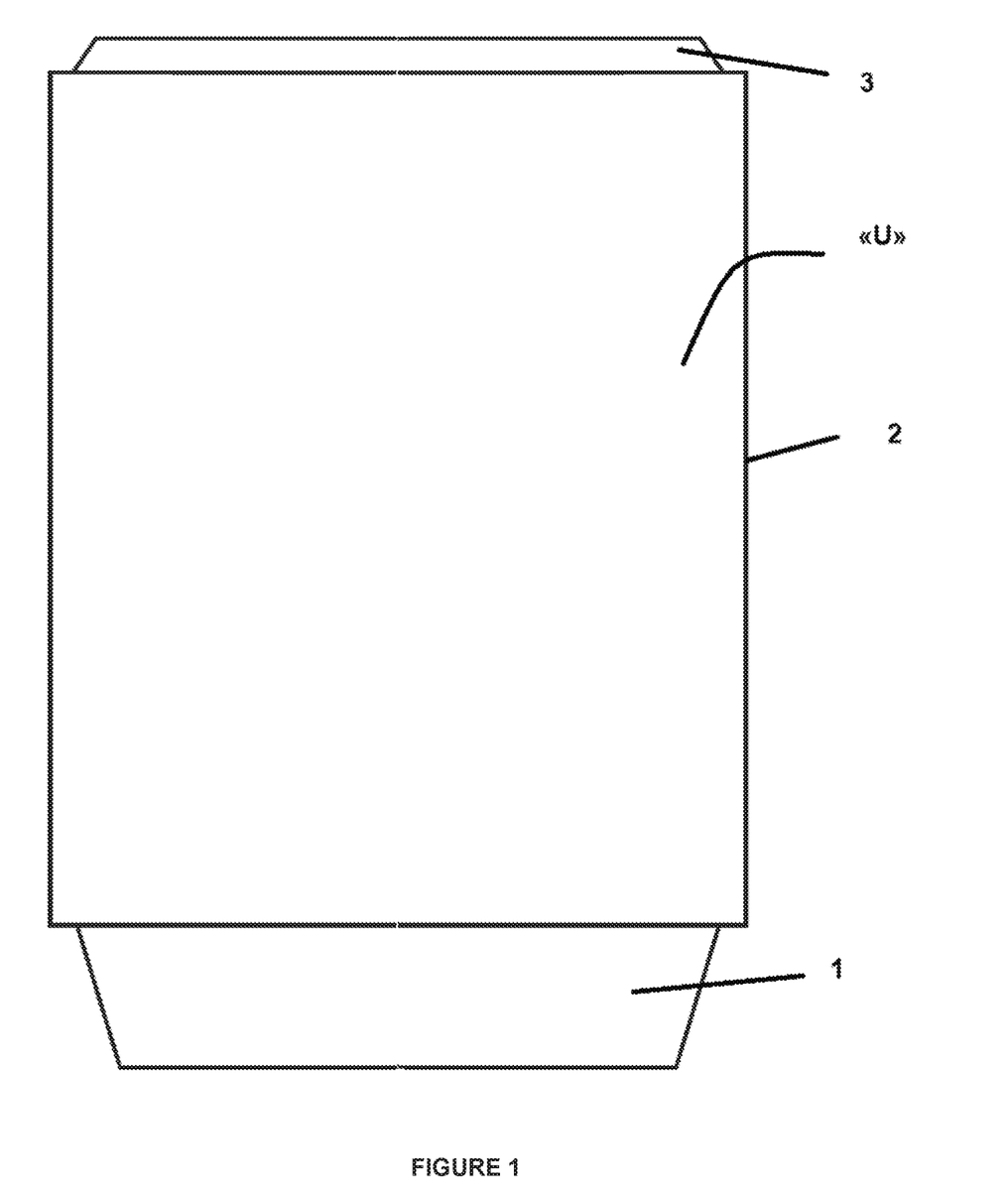
FIG. 1 represents a side elevational view of a biodegradable funeral urn made of a cured, biodegradable material according to the invention.
Figure 2:
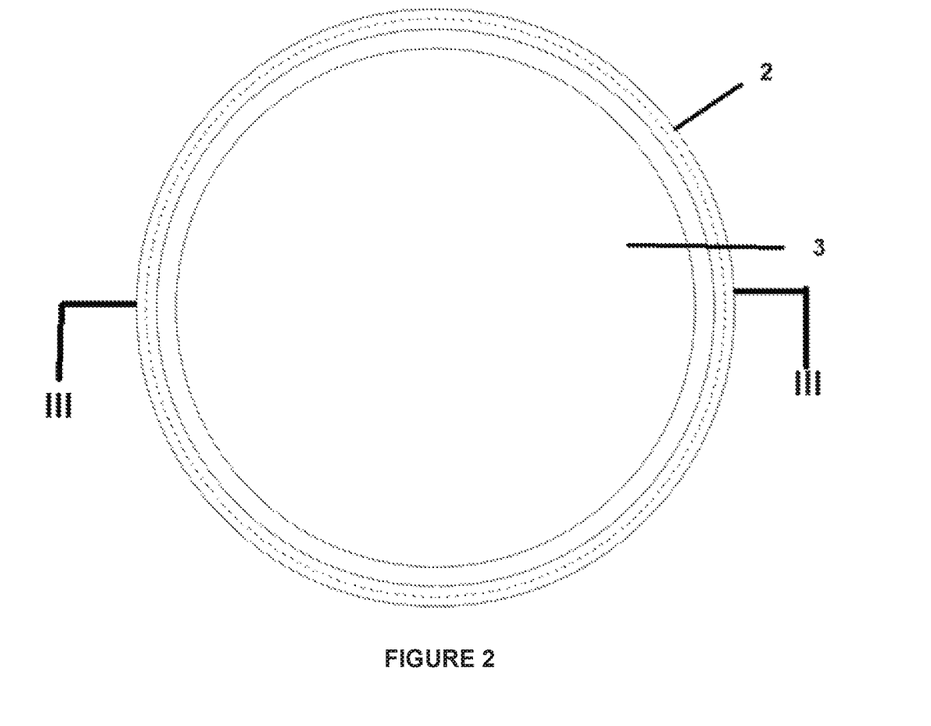
FIG. 2 represents a top plan view of the biodegradable funeral urn of FIG. 1.
Figure 3:
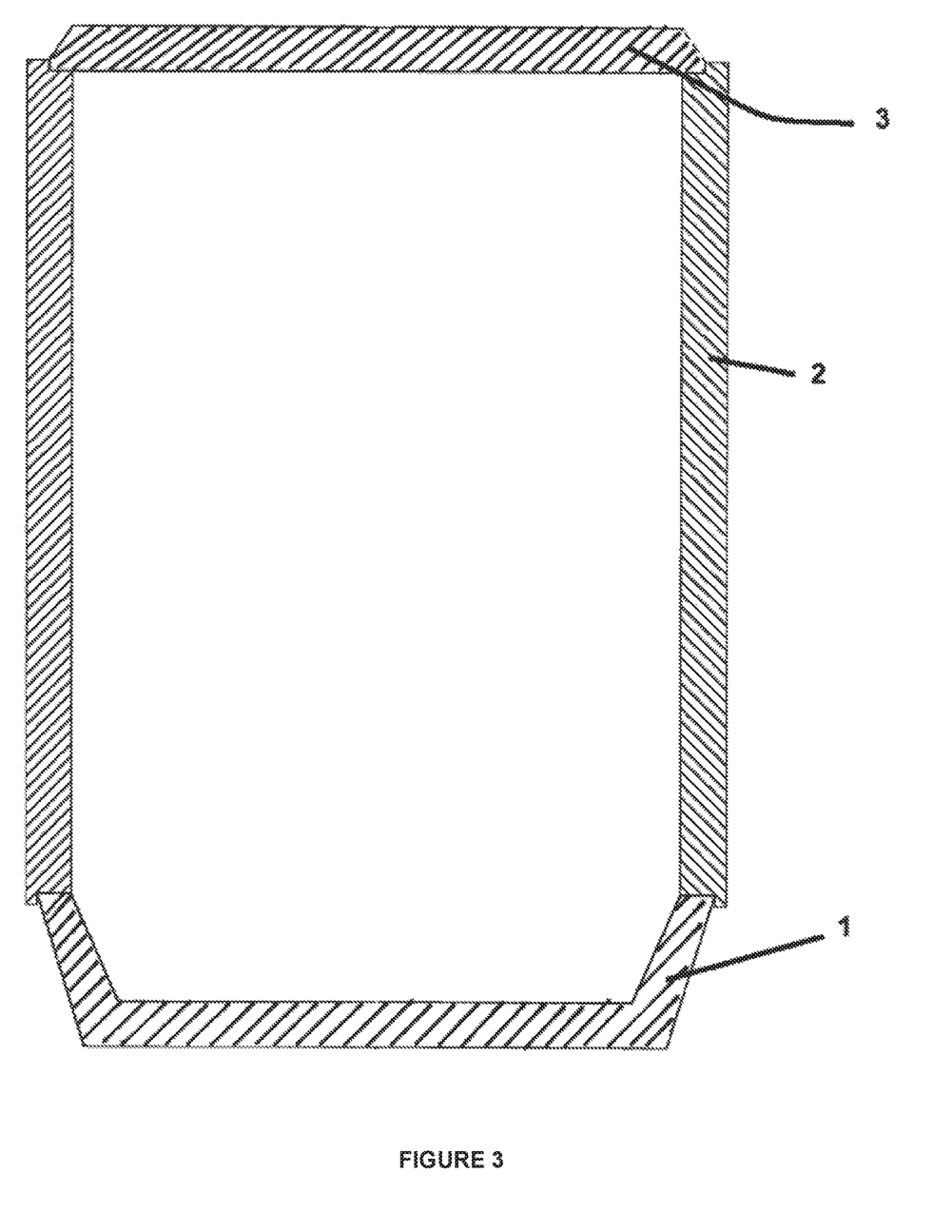
FIG. 3 represents a cross-sectional view according to line III-III of the biodegradable funeral urn of FIG. 2.

Various parts of a biodegradable funeral urn «U» were prepared using the pourable, water-containing, uncured and biodegradable composition of example 2, according to the process of example 3. More particularly, the biodegradable funeral urn «U» comprises a base part 1, a body part 2 and a cover part 3, as illustrated in FIGS. 1 to 3. Parts 1, 2 and 3 are assembled together to form the biodegradable funeral urn «U». Of course, alternatively, the biodegradable funeral urn may have a complex shape involving the presence of several parts of biodegradable articles assembled together.

For each part 1, 2 and 3, the pourable, water-containing, uncured and biodegradable composition was poured into a corresponding mould, Then, parts 1, 2 and 3 were removed from their corresponding moulds, placed on a grid for complete drying, eventually cleaned with a knife, and then manually assembled together using small amount of fish glue to fasten them together. The fish glue is applied by any appropriate applicator (spatula, brush, etc.).

The resulting cured, biodegradable urn «U» after having buried in the soil showed a complete degradation after 1 month.

The present invention has been described with respect to its preferred embodiments. The description and the drawings are only intended to aid to the understanding of the invention and are not intended to limit its scope. It will be clear to those skilled in the art that numerous variations and modifications can be made to the implementation of the invention without being outside the scope of the invention. Such variations and modifications are covered by the present invention. The invention will be now described in the following claims:

The invention claimed is:

1. Powdered composition useful for the preparation of a biodegradable material, said composition comprising:
    40 to 95 wt. % of a gypsum containing material that is environmentally acceptable;
    up to 60 wt. % of particles of at least one environmentally acceptable filler; and
    3 to 10 wt. % of an environmentally acceptable binding agent.

2. The powdered composition according to claim 1, wherein the gypsum containing material is a recycled gypsum.

3. The powdered composition according to claim 2, wherein the recycled gypsum is at least partially dehydrated into a hemihydrate gypsum and/or a calcined gypsum.

4. The powdered composition according to claim 1, wherein the particles of the at least one environmentally acceptable filler, are selected from the group consisting of stone particles, mineral particles, glass particles and microspheres residues, and/or selected from the group consisting of environmentally acceptable plant base residues.

5. The powdered composition according to claim 1, wherein the environmentally acceptable binding agent is a starch.

6. The powdered composition according to claim 5, wherein the environmentally acceptable starch is wheat starch or corn starch.

7. The powdered composition according to claim 1, wherein the gypsum containing material is a recycled gypsum; wherein the particles of the at least one environmentally acceptable filler, are selected from the group consisting of stone particles, mineral particles, glass particles and microspheres residues, and/or selected from the group consisting of environmentally acceptable plant base residues; wherein the environmentally acceptable binding agent is wheat starch or corn starch; and wherein the weight ratio powdered composition:water is about 100:50.

8. A pourable, water-containing, uncured and biodegradable composition comprising a mixture of a component A and a component B,
    wherein the component A comprises:
        40 to 95 wt. % of a gypsum containing material that is environmentally acceptable;
        up to 60 wt. % of particles of at least one environmentally acceptable filler; and
        3 to 10 wt. % of an environmentally acceptable binding agent; and
    wherein the component B comprises water; and
    wherein the weight ratio component A:component B varies from 100:40 to 100:100.

9. The pourable, water-containing, uncured and biodegradable composition according to claim 8, wherein the gypsum containing material is a recycled gypsum.

10. The pourable, water-containing, uncured and biodegradable composition according to claim 9, wherein the recycled gypsum is at least partially dehydrated into a hemihydrate gypsum and/or a calcined gypsum.

11. The pourable, water-containing, uncured and biodegradable composition according to claim 8, wherein the particles of the at least one environmentally acceptable filler, are selected from the group consisting of stone particles, mineral particles, glass particles and microspheres residues, and/or selected from the group consisting of environmentally acceptable plant base residues.

12. The pourable, water-containing, uncured and biodegradable composition according to claim 8, wherein the environmentally acceptable binding agent is a starch.

13. The pourable, water-containing, uncured and biodegradable composition according to claim 12, wherein the starch is wheat starch or corn starch.

14. The pourable, water-containing, uncured and biodegradable composition according to claim 8, wherein the gypsum containing material is a recycled gypsum; wherein the particles of the at least one environmentally acceptable filler, are selected from the group consisting of stone particles, mineral particles, glass particles and microspheres residues, and/or selected from the group consisting of environmentally acceptable plant base residues; wherein the environmentally acceptable binding agent is wheat starch or corn starch; and the weight ratio component A:component B is about 100:50.

15. A method for the preparation of the pourable, water-containing, uncured and biodegradable material as defined in claim 8, wherein said method comprises a step of mixing the component A with the component B in a weight ratio component A:component B varying from 100:40 to 100:100.

16. A method for the preparation of a cured and biodegradable article, said method comprising the step of:
    pouring a pourable, water-containing, uncured and biodegradable composition comprising a mixture of a component A and a component B,
    wherein the component A comprises:
        40 to 95 wt. % of a gypsum containing material that is environmentally acceptable;
        up to 60 wt. % of particles of at least one environmentally acceptable filler; and
        3 to 10 wt. % of an environmentally acceptable binding agent;
    wherein the component B comprises water; and
    wherein the weight ratio component A:component B varies from 100:40 to 100:100, into a mould;
    curing the pourable, water-containing, uncured and biodegradable composition contained in the mould; and
    recovering from the mould, the cured and biodegradable article.

17. The method according to claim 16, wherein the curing is carried out by subjecting the pourable, water-containing, uncured and biodegradable composition contained in the mould, to a heat treatment in order to cure the pourable, water-containing, uncured and biodegradable composition and provide the cured and biodegradable article.

18. The method according to claim 17, wherein when the recycled gypsum is at least partially dehydrated into a hemihydrate gypsum or a calcined gypsum, the heat resulting from the reaction of water with the at least partially dehydrated into a hemihydrate gypsum replacing at least a part of the heat required for obtaining the cured and biodegradable article.

19. A cured and biodegradable article obtained from the method defined in claim 16.

20. A biodegradable article comprising the moulded biodegradable article obtained from the method defined in claim 16, said biodegradable article comprising at least two distinct parts, at least one of said at least two distinct parts comprising the moulded biodegradable article, and the at least two distinct parts being joined together by an environmentally acceptable adhesive.

21. The biodegradable article according to claim 20, which is a funeral urn which disaggregates in the soil within one week to three months.

* * * * *

UNITED STATES PATENT AND TRADEMARK OFFICE
CERTIFICATE OF CORRECTION

PATENT NO. : 11,779,502 B2
APPLICATION NO. : 16/739228
DATED : October 10, 2023
INVENTOR(S) : Bisson It is certified that error appears in the above-identified patent and that said Letters Patent is hereby corrected as shown below:

On the Title Page

Item (54) and in the Specification, Column 1, Lines 1-6, delete "POWDERED COMPOSITION, A POURABLE, WATER-CONTAINING, UNCURED BIODEGRADABLE COMPOSITION, A CURED BIODEGRADABLE ARTICLE, PREPARATION METHODS, AND USES THEREOF" and substitute therefore -- POWDERED COMPOSITION; POURABLE, WATER-CONTAINING, UNCURED BIODEGRADABLE COMPOSITION; CURED BIODEGRADABLE ARTICLE; PREPARATION METHODS; AND USES THEREOF --.

Item (71), delete "Outremont (CA)" and substitute therefore -- Montreal (CA) --.

In the Specification

Column 7, Line 22, delete "composition:water" and substitute therefore -- composition: water --; and Column 7, Line 28, delete "position:water" and substitute therefore -- position: water --.

In the Claims

Column 11, Line 40 (Claim 7), delete "composition:water" and substitute therefore -- composition: water --.

Column 12, Line 16 (Claim 14), delete "A:component" and substitute therefore -- A: component --; and Column 12, Line 22 (Claim 15), delete "A:component" and substitute therefore -- A: component --; and Column 12, Line 36 (Claim 16), delete "A:component" and substitute therefore -- A: component --.

Signed and Sealed this
Thirteenth Day of February, 2024

Katherine Kelly Vidal
*Director of the United States Patent and Trademark Office*